United States Patent [19]

Hsu et al.

[11] Patent Number: 4,870,627

[45] Date of Patent: Sep. 26, 1989

[54] METHOD AND APPARATUS FOR DETECTING AND EVALUATING BOREHOLE WALL FRACTURES

[75] Inventors: Kai Hsu, Danbury; Alain Brie, Bethel, both of Conn.; Richard A. Plumb, North Tarrytown, N.Y.

[73] Assignee: Schlumberger Technology Corporation, Ridgefield, Conn.

[21] Appl. No.: 686,127

[22] Filed: Dec. 26, 1984

[51] Int. Cl.$^4$ .............................................. G01V 1/00
[52] U.S. Cl. ...................................... 367/69; 367/25; 367/26; 367/33
[58] Field of Search .................. 367/69, 35, 31, 33, 367/25-30, 32, 34; 181/105; 364/422; 73/151

[56] References Cited

U.S. PATENT DOCUMENTS

| | | | |
|---|---|---|---|
| 4,131,875 | 12/1978 | Ingram | 367/27 |
| 4,432,077 | 2/1984 | Alhilali . | |
| 4,543,648 | 9/1985 | Hsu | 367/33 |
| 4,567,759 | 2/1986 | Ekstrom et al. | 73/151 |
| 4,587,641 | 5/1986 | Di Foggio | 367/35 |
| 4,594,691 | 6/1986 | Kimball et al. | 367/32 |
| 4,607,352 | 8/1986 | Seeman et al. | 367/69 |

OTHER PUBLICATIONS

"Semblance Processing of Borehole Acoustic Array" Data-Geophysics vol. 49, No. 3, Mar., 1984.
"Synthetic Microseismograms: Logging in Porous Formations" Geophysics, vol. 39, No. 1, Feb., 1974.
"The Long Spaced Acoustic Logging Tool" SPWLA 25th Annual Logging Symposium, Jun. 10-13, 1984.
"Investigation of Acoustic Boundary Waves and Interference Patterns as Techniques for Detecting Fractures" Journal of Petroleum Technology, 1978.
"Permeability Profiles from Acoustic Logging" Journal of Petroleum Technology, 1977.

Primary Examiner—Thomas H. Tarcza
Assistant Examiner—Daniel T. Pihulic
Attorney, Agent, or Firm—Clifford L. Tager

[57] ABSTRACT

A method and apparatus are described for generating a quick look display of an acoustic investigation of a borehole wherein a parameter of interest is derived from vertically spaced sonic receivers and displayed in a laterally continuous display log where the parameter values from respective receivers are recorded at preassigned positions. A fracture sensitive parameter is measured such as the energy in a low frequency Stoneley wave and when the parameter values are laterally recorded areas indicative of fractures become visually enhanced particularly with a laterally expanded display log. Techniques for the detection and evaluation of fractures are described.

53 Claims, 6 Drawing Sheets

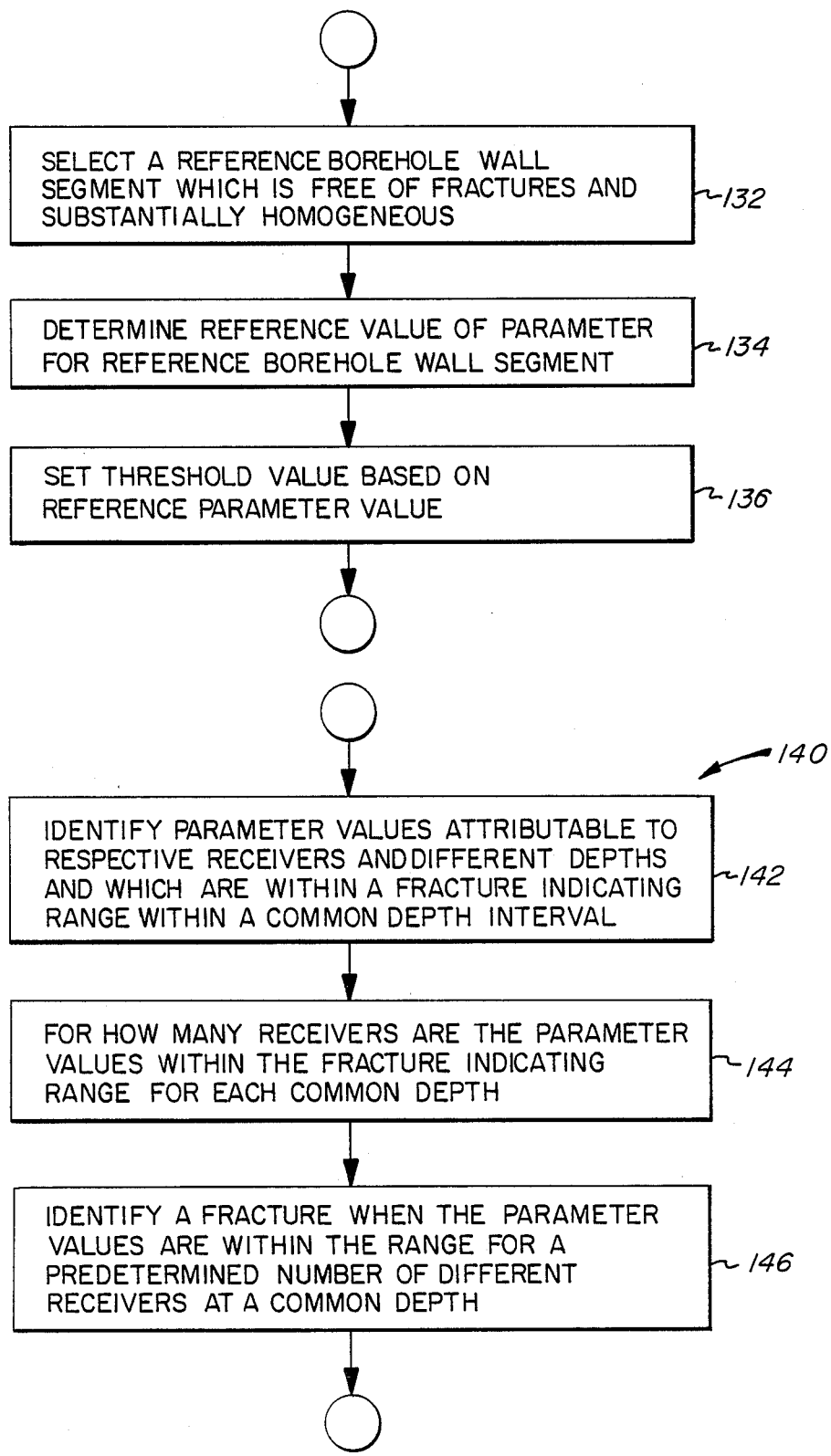

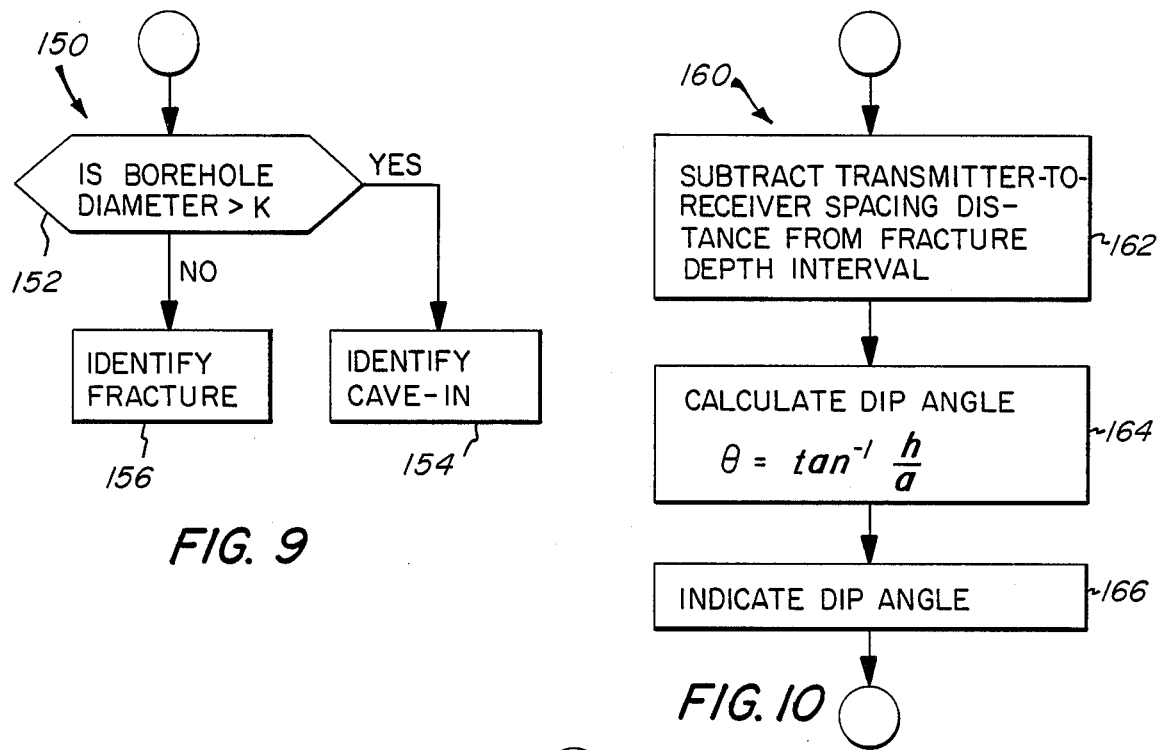
FIG. 9
FIG. 10
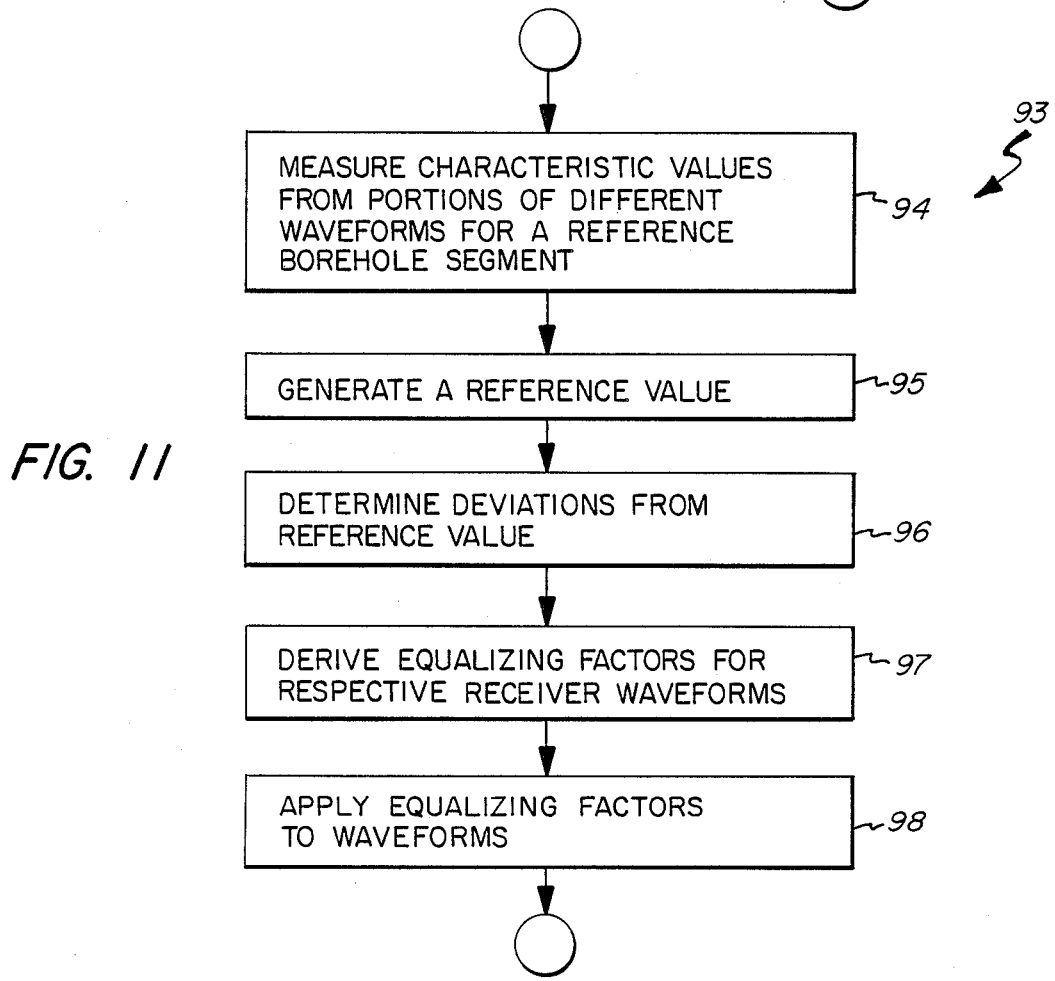
FIG. 11

METHOD AND APPARATUS FOR DETECTING AND EVALUATING BOREHOLE WALL FRACTURES

FIELD OF INVENTION

This invention relates to a method and apparatus for determining the presence of fractures in a wall of a borehole penetrating an earth formation and for evaluating a detected fracture. This invention further relates to a method and apparatus for forming a display of an acoustic investigation of a borehole and with which an indication of a characteristic of the earth formation such as fractures in the borehole wall can be made.

BACKGROUND OF THE INVENTION

In typical acoustic investigations of earth formations from inside a borehole a tool is used with a sonic pulse generating transmitter and a plurality of sonic receivers. These are spaced from the transmitter and produce waveforms representative of the acoustic waves incident upon the receivers after having traveled through the earth formation and the borehole. The acoustic waves arriving at the receivers include distinctly detectable waves such as the compressional, shear, the direct or borehole fluid, and Stoneley, The Stoneley waves are deemed as late arrivals, i.e. waves whose velocity is less (or whose slowness is greater) than the direct or mud wave (see U.S. Pat. No. 4,131,875 to Ingram). The acoustic tool may be formed with a sonic pulse transmitter with many receivers such as four in the Ingram patent or twelve as described in an article entitled "Semblance Processing Of Borehole Acoustic Array Data" by Kimball and Marzetta and published in Geophysics Vol. 49, No. 3, March 1984.

Late arrival waves, such as zero order, low frequency Stoneley waves are boundary waves whose amplitudes in homogeneous and non-fractured earth formations exhibit little or no attenuation over the transmitter-receiver spacings normally encountered with acoustic borehole logging tools. Such late arrival waves, however, are known to be sensitive to variations in the borehole diameter, the permeability of the earth formation and the presence of fractures. Such sensitivity is revealed by a change in the amplitude of the late arrival wave.

For example an article entitled "Synthetic Microseismograms: Logging In Porous Formations," by J. H. Rosebaum and published in Geophysics Vol. 39, No. 1 (February, 1974) at pages 14–32 describes a theoretical technique using Stoneley waves to obtain an indication of permeability from a measurement of their attenuation. U.S. Pat. No. 4,432,077 and an article entitled "A Long Spaced Acoustic Logging Tool" by Williams et al and presented at the SPWLA twenty-fifth annual logging symposium held in June 10–13, 1984 describe a technique to obtain an indication of permeability by measuring amplitude loss or energy loss of the tube wave and using the ratio of these parameters as detected by two vertically spaced receivers located in a borehole. A standard well known variable density display (VDL) of detected acoustic waves is shown and an increased signal-to-noise ratio is obtained by real-time stacking of eight waveforms attributable to different transmitter pulses. E. A. Koerperich presented a paper published at pages 1199–1207 in the August, 1978 publication of the Journal of Petroleum Technology and entitled "Investigation of Acoustic Boundary Waves and Interference Patterns As Techniques for Detecting Fractures". In this article the use of low frequency Stoneley waves to identify fractures is suggested.

Although these techniques describe ways to select the late arrival from waveforms with particular energy displays as shown in the Ingram patent, a need exists to provide a technique for detecting or indicating and evaluating the presence of a fracture in a fast, clear and unambiguous manner while a borehole is being logged by an acoustic tool.

SUMMARY OF THE INVENTION

With a technique in accordance with the invention borehole wall indications and evaluations of the presence of fractures can be obtained and displayed in a clear manner. As described herein for one technique in accordance with the invention an acoustic investigation tool using a sonic pulse transmitter with an array of sonic receivers is used. Waveforms from the receivers are processed whereby a fracture-sensitive arrival in the waveforms such as the Stoneley wave is selected and a fracture sensitive parameter, such as the energy of the selected arrival is measured. The parameter measurements attributable to the waveform from respective receivers are then displayed at preassigned lateral positions on a log. The parameter measurements may be recorded with a grey-scale related to the magnitude of the measurements.

With a display in accordance with the invention a lateral spatial representation of vertically redundant measurements of a parameter is obtained. For example, when the effect of a fracture is present in each of the waveforms from the different vertically spaced sonic receivers the lateral display of the parameter enhances the indication of a fracture. Thus with each of the sonic receivers located opposite a fracture, the parameter measurements derived from their respective waveforms will exhibit a reduced amplitude which is visually enhanced by the lateral display of grey-scale values of the measurements. A visual inspection of this display log would clearly reveal a reduced intensity region that extends laterally across the display log to thus indicate a region that may have one or more fractures.

Since borehole enlargements such as cave-ins also affect the amplitude of Stoneley waves and thus the parameter measurement, reference to a caliper log, which indicates the borehole diameter, can provide assurance that the region exhibiting a reduced intensity is likely to be representative of a fracture. Also, caliper information can be used to correct the Stoneley wave amplitude.

With a technique in accordance with the invention a real-time fracture indicating display can be provided for a "quick-look". For example, with refer ence to one embodiment in accordance with the invention, the waveforms from the receivers are processed by a surface located processor essentially as they are generated. The fracture-sensitive portion is selected with a frequency filter. The energy in the selected wave portion is then computed as the parameter that is sensitive to fractures in the borehole wall. The parameter values from the waveforms from respective receivers are then assigned lateral positions on a display log and recorded thereon with grey scale values related to their amplitudes. Fractures will show up as regions of contrasting intensity which extends laterally across the entire log.

The quick look display feature can be emphasized if desired by laterally expanding the display log. This is done by generating intermediate parameter values for display log locations that are between the preassigned positions. These intermediate parameter values can be generated with a linear interpolation technique.

The quick-look display can be particularly effective during the acoustic logging of an open borehole, i.e. before expensive casing is put in place. If in such case a display log indicates the likelihood of one or more fractures in a producing zone there is a greater confidence and basis for proceeding to set the casing in the open borehole.

A fracture indicating display log can also be made by processing the selected portions in a signal processor in a manner by which a zone can be identified as likely to have a fracture. A suitable indication can then be placed on the log for such fractured zones and become particularly effective when placed alongside other measurements such as the borehole diameter (caliper measurement) and compressional wave and shear wave slowness values.

One technique for determining the presence of fractures involves comparing the values of a parameter, which is sensitive to fractures, with a threshold level, on one side of which parameter values are interpreted as indicative of a fracture while parameter values on the other side of the threshold level are interpreted as for an earth-formation that is free of fractures.

The comparisons can be made between parameter values from a receiver as it produces waveforms at different depths and the results then compared with a threshold. The comparison can also be made with a threshold whose level represents a parameter value for a reference borehole segment that seems likely to be free of fractures. Such reference borehole segment is commonly available since in practice the entire borehole is unlikely to be fractured. A recording of indications representative of fractures can then be made along a narrow band of a display log or with a wider expanded band when the comparison results obtained from waveform portions of the various receivers are laterally expanded in accordance with the invention.

A particularly advantageous feature of a fracture determining technique in accordance with the invention resides in its use of the redundancy of information present in the waveforms from respective receivers when an array of receivers is used or from a single receiver when a plurality of transmitters are used. A greater level of confidence in the presence of a fracture at a particular depth interval is obtained by determining for how many different receivers a fracture sensitive parameter value for a common depth within the depth interval, falls within a fracture-indicating range. One method for determining a fracture may involve a stacking or other combining method of the parameter values attributable to a common sonic pulse but derived from the different receivers in the array. When the combined value less than a threshold or reference level, a fracture can be deemed to be present and an indication to that effect recorded and an evaluation of the size and depth of the fracture estimated from the amount of reduction in the stacked parameter value. Absent cave-ins a substantial sudden reduction in the parameter value identifies the presence of high permeability indicative of features such as single or multiple fractures or a deep fracture.

With a technique for determining fractures in accordance with the invention high angled fractures, i.e. those with large dip angles can be identified. A measurement of the fracture dip angle can be made. For example, when the fracture sensitive parameter values for the waveforms from a receiver indicate the presence of a single fracture or planar fractured zone over a particular depth interval, the height of that interval represents the combination of the borehole height of the fracture and the transmitter to receiver spacing. Since the latter spacing is known, its subtraction from the depth interval height provides a measurement of the fracture height. An indication of the dip angle may then be obtained by assuming the presence of a single fracture or a planar fractured zone and using the trigonometric relationship between the known borehole diameter and the measured fracture height. Different dip angles for fractures can in this manner be determined and displayed.

A technique for forming a display in accordance with the invention can be applied to other acoustic waves and parameters of interst such as compressional and shear waves and their respective slowness, amplitude and energy values.

It is, therefore, an object of this invention to provide a method and apparatus for determining the presence of fractures from an acoustic investigation of a borehole and provide an evaluation of such fractures. It is a further object of the invention to provide a sonic borehole investigation method and apparatus for forming a display log with which vertically redundant information of a characteristic of an acoustic arrival is displayed with visual enhancement to obtain a clear indication of the characteristic. It is still further an object of the invention to provide a method and apparatus to detect and evaluate fractures in the wall of a borehole penetrating an earth formation such as the degree of permeability or size of the fracture and the dip angle of a detected fracture.

These and other advantages and objects of the invention can be understood from the following detailed description of several embodiments with reference to the drawings.

BRIEF DESCRIPTION OF DRAWINGS

FIG. 1A is a portion of a display log in accordance with the invention and a display log for the same borehole section obtained with an ultrasonic frequency tool;

FIGS. 7 is a block diagram of technique for use in the embodiment of FIG. 4;

FIG. 8 is a block diagram for a technique in accordance with the invention to determine the presence of a fracture;

FIG. 9 is a chart of steps used to distinguish a cave-in from a fracture;

FIG. 10 is a chart of steps for a technique used to determined the dip angle of a fracture; and FIG. 11 is a chart of steps used to illustrate details for an equalizing process used in the embodiment of FIG. 1.

DETAILED DESCRIPTION OF THE DRAWINGS

Figure 1:
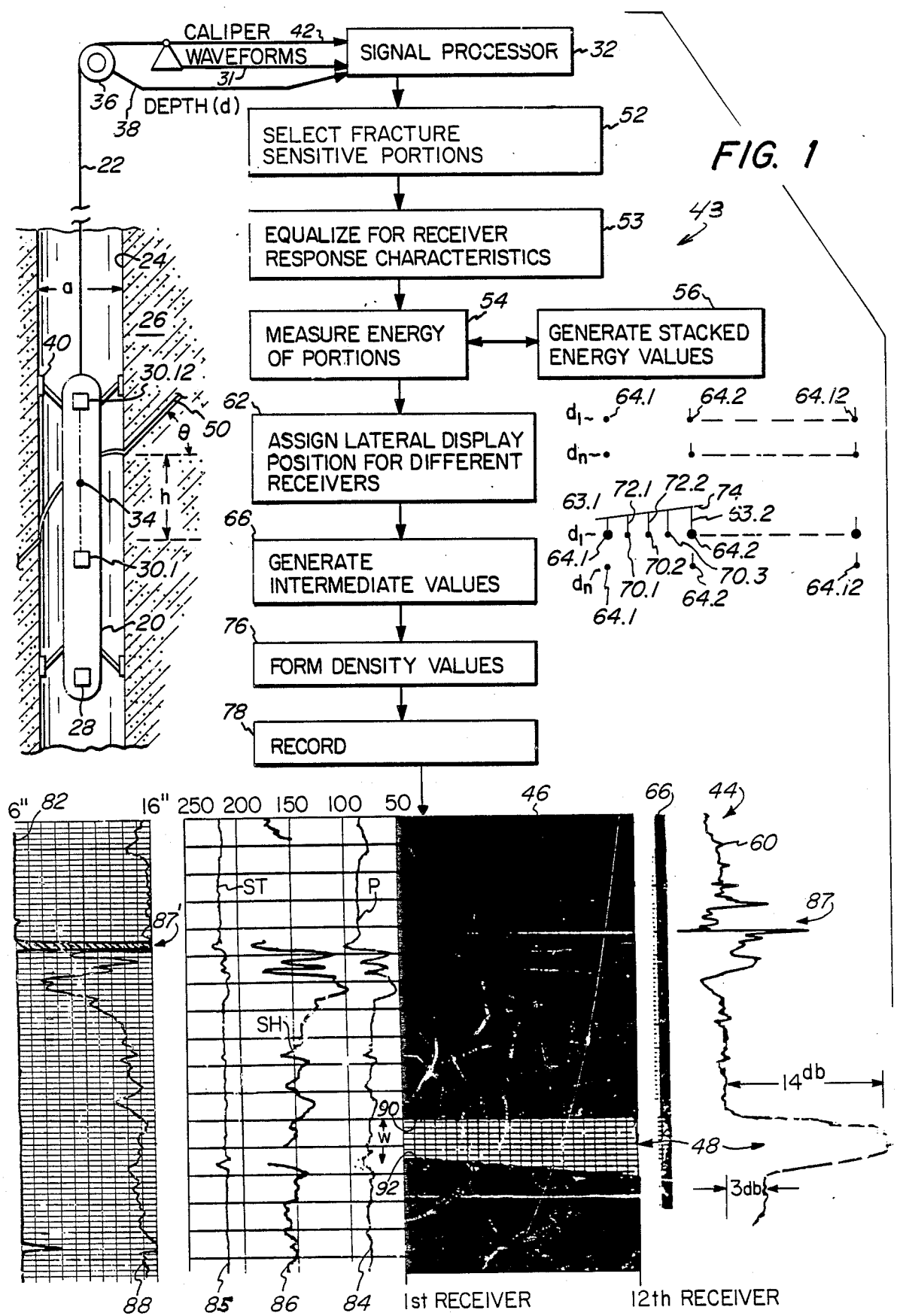
FIG. 1 is a block diagram and a portion of a display log in accordance with the invention and derived from an acoustic investigation from inside a borehole.

With reference to FIG. 1 an acoustic investigation tool 20 is shown suspended from a cable 22 in a borehole 24 penetrating an earth formation 26. Tool 20 is shown as including a sonic pulse generating transmitter 28 and an array of twelve sonic receivers 30.1 through 30.12. Tool 20 may be of the type such as more particularly described in the aforementioned Kimball and Marzetta article and may have a greater number of receivers or fewer such as eight or less. Generally tool 20 will include a sonic transmitter 28 capable of generating acoustic waves which include compressional, shear, and Stoneley waves. Tool 20 may be formed with a plurality of vertically spaced transmitters and a single or plurality of vertically spaced receivers.

The acoustic waves travel through the earth formation 26 and the borehole 24 and are incident upon the sonic receivers 30.1-30.12. The latter generate waveforms which are measurements of pressure disturbances versus time, and which are sampled using a tool mounted analog to digital converter (not shown) and the samples in digital form are transmitted up-hole along conductors in cable 22 on a line 31 to a surface located signal processor 32. The depth of tool 20, i.e. with reference to a particular point such as 34 the midpoint between receivers 30 is measured with a depth sensor 36 coupled to cable 22 and produces a depth signal on line 38. Since the distances of reference point 34 from receivers 30.1-12 and transmitter 28 are known, their depth can be determined from the depth sensor measurement on line 38.

Tool 20 preferably also includes a caliper 40 for measuring the diameter of a borehole 24 and a caliper signal is sent along cable 22 to signal processor 32 on line 42. Other controls and signals are generated as are commonly provided with tools such as 20.

Tool 20 is particularly effective in generating waveforms which include a late arrival such as the Stoneley wave by use of a sonic transmitter 28 whose sonic pulses include low frequency sonic energy below about 5 KHz. Processing of the waveforms by signal processor 32 may include the detection of compressional and shear and Stoneley waves using techniques such as described in the Kimball and Mazetta article. The detection of these waves by using all of the waveforms from the receivers 30.1-12 may be done in real-time as the waveforms are generated or at a remotely located signal processing facility.

In the logging of a borehole it is desirable to obtain a prompt indication, a quick-look, of the investigation in the open borehole before casing is set. For example if it can be ascertained that no fracture exists at a producing zone the placement of expensive casing can be avoided or if a positive indication of an open fracture is obtained the casing can be set with greater confidence. Since the casing should be set as soon as possible after drilling of the borehole, there is little time to wait for the results from a remote signal processor. The availability of a real-time display with a positive indication of a fracture can, therefore, be of great assistance.

The term "real-time" as used herein the formation of a display log, therefore, includes the generation of a display as the waveforms are generated, or very shortly thereafter either while the tool 20 is still in the borehole or before casing is placed in the open borehole.

In the embodiment of FIG. 1 a technique 43 is shown with which a quick look to indicate the presence of fractures can be obtained. Such quick look includes a display log 44 which records a laterally continuous variable density log at 46 of the values of a parameter that is sensitive to fractures. The parameter is in this embodiment the value of the energy in a late arrival such as a low frequency Stoneley wave and is recorded at lateral positions for respectively associated receivers 30.1-12. In the display 46 the redundancy present in the waveforms from the receivers is laterally visually enhanced and reveals at regions such as 48 the likelihood of a fracture such as shown at 50.

Technique 43 commences at 52 with the selection of a portion which is sensitive to fractures. The Stoneley arrivals may be selected by first windowing the waveforms and then passing the windowed portion through a low pass or band pass filter in a manner as more particularly described in the U.S. Pat. No. 4,131,875 to Ingram. The filtering may be done with a digital recursive filter when digital samples are employed or by using an analog filter when the digital windowed portion is converted to an analog form with a d/a converter. With a long transmitter-to-receiver spacing on tool 20 there is enough time separation between interfering waves to also employ a time window to select a late arrival wavelet of interest. Since the time windowing operation required prior knowledge of the wave component, i.e. its slowness and arrival time other known techniques as described in the aforementioned Kimbal and Marzetta article may be used to acquire such knowledge for the waveform.

The selection process at 52 may involve only a frequency filtering operation such as selecting the low frequency Stoneley waves below about 5 KHz. A Stoneley wave of interest is the zero order wave which is sensitive to the presence of fractures. This wave is particularly strong at lower frequencies below about 5 KHz for a 20 cm (8 inch) borehole. For smaller diameter boreholes a somewhat higher frequency source can be used to excite the Stoneley wave of interest. At these frequencies the compressional and shear waves can be excluded with a low pass or band pass filter. The Stoneley wave of interest may be stimulated with a transmitter operating at a center acoustic frequency that is preferably at about 10 KHz and having sufficient energy in the lower frequencies of interest.

The receivers 30.1-12 and associated electronic amplifiers do not always operate with the same efficiency and amplification and the differences in their respective waveforms would show as streaks on the display log 44. Accordingly, the selected waveform portions from the receivers are equalized at 53 for variations in the characteristics of the electronic processing. The equalization step may be done by compensating the respective receiver responses with those obtained for a reference borehole segment for which the arrival is known to remain substantially unattenuated over the length of the receiver array. Equalization step 53 may also employ a pre-calibration of the receivers which is taken into account during waveform processing.

Once the Stoneley portion is selected at 52 a parameter signal representative of its energy is measured at 54.

This may be done by integrating the squares of the sample values selected at 52 for each of the waveforms. Alternatively the amplitude of the Stoneley wave portion may be measured.

The receivers 30.1-12 each respond to the same transmitter pulse by detecting an acoustic wave at a different depth. The fracture sensitive parameter values measured at 54 and attributable to the same sonic pulse are combined at 56 by stacking. The stacked energy values may be recorded at trace 60 on display log 44. The trace 60 is formed by recording its logarithmic value using a conventional logarithm conversion calculation.

The measured energy values determined at 54 are assigned lateral display positions at 62 in correspondence with the receiver 30 from whose waveform the parameter value was derived. Thus the parameter values 63.1 attributable to receiver 30.1 are recorded at position 64.1 and those values 63.12 related to receiver 30.12 are placed at position 64.12. Though these values can be recorded with close spacings as shown with a display log 66, a further visual enhancement is obtainable by expanding the lateral scale of log 66.

Such lateral expansion is obtained by generating at 68 intermediate parameter values 70 for lateral display log locations 72 that are between the pre-assigned positions 64. The intermediate parameter values 72 may be determined by a linear interpolation technique. Fur example each intermediate location 70 will have a parameter value 72 that is calculated by assuming a straight line variation between the values 63 at the lateral positions 64 as suggested by straight line 74.

The values of the parameter are converted at 76 to optical values such as would provide a variable density display 46 or entail different colors for different ranges of the parameter. Signal processing routines are commercially available to provide the appropriate density values for the display 46. The optical values are then recorded at 78 with the higher intensities represented by darker colors and at the assigned lateral positions and locations on the display log 46.

The recording step 78 may include recording such other characteristics such as the stacked energy values with trace 60, a caliper trace 82 to indicate the diameter of the borehole 24 and slowness value traces 84, 86 and 85 for the compressional, shear and Stoneley waves respectively, and the gamma ray trace 88. The caliper trace 82 assists the interpretation of the fracture log 46. For example, at 87 the stacked parameter trace exhibits large variations indicative of fractures. However, the caliper trace at 87' exhibits a corresponding large variation thus indicating a cave-in rather than a fracture at 87.

With the Stoneley energy log 46 significant energy losses can be quickly visualized such as at 48. Since the caliper trace 82 for the depth of event 48 shows a good borehole in this region, the anomaly at 48 may indicate a fracture. Verification that such fracture 50 indeed exists at that depth was obtained with the log 91 of FIG. 1A made with a high ultrasonic borehole wall investigation tool operating at acoustic frequencies of the order of several megahertz. Such tool does not provide a consistently useable display of the borehole wall. However, in this instance the fracture 50 can be seen at 93 and confirms the fracture indication 48 in the display log 44.

A characteristic feature of the anamoly at 48 is its trapezoidal shape with upper edge 90 being horizontal from the first receiver 30.1 position 64.1 to the last receiver 30.12 position 64.12 while the lower edge 92 is slanted. This shape can be explained on the basis that as the upper receiver 30.12 enters the zone with fracture 50, the Stoneley energy received by this receiver 30.12 is reduced but there is no effect on the Stoneley energy detected by the other receivers 30.1-11. Since a Stoneley energy loss is encountered by lower receivers as they enter the fracture zone successively, a tiled edge 92 appears at the bottom of the anomaly 48. The horizontal orientation for the upper edge 90 identifies the location where the transmitter 28 leaves the borehole zone opposite fracture 50.

The anomaly 48 can be used to derive an indication of the dip angle of the fracture 50. The dip angle $\theta$, is the angle that the plane of the fracture makes with a plane that is transverse, usually horizontal, to the borehole axis. Such dip angle can be estimated because the vertical or borehole height h of fracture 50 is equal to the difference between the width, w, of the anomaly as it appears at 48 and the applicable transmitter-receiver spacing TR. The dip angle can then be calculated by the relationship $$\theta = \tan^{-1}\frac{w - TR}{a} = h/a$$

where a is the borehole diameter. The value for w can be obtained from any lateral position along log 46 with the spacing TR correspondingly determined.

The stacked energy trace 60 is particularly effective in providing an evaluation of the fractures. For example, the Stoneley energy drop for the fracture anomaly at 48 is of the order of more than 10 db. Since a closed fracture consumes less energy in pushing or sucking fluid from the fracture than an open fracture does, the magnitude of the Stoneley energy loss often is effective in quantifying the fracture opening.

Note that the regions above and below the fracture zone exhibit a Stoneley energy difference of about 3.2 db. This may be attributable to a greater permeability to the region below the fracture 50.

The equalization step 53 can be implemented with a technique 93 such as illustrated in FIG. 11. There, at 94 a characteristic of the waveforms is measured for a reference borehole segment which is known to be free of fractures, homogeneous and straight. In such segment the Stoneley wave should exhibit little attenuation so that the amplitude or energy of the Stoneley wave should remain substantially constant. Variations in the characteristic value, or amplitude, are attributed to unequal gain characteristics of the receivers 30.1-12. In order to correct these inequalities and thus the vertical streaks they would cause on display log 44, the characteristic values of the respective receiver waveforms are measured at 94 for the reference borehole segment.

A reference value is then generated at 95 such as by calculating the average or median, or even selecting one of the measured values such as from the first receiver 30.1. The deviations, such as the difference of the different receiver waveform characteristic values from the reference are then calculated at 96.

Equalization factors are then determined at 97. These factors are for example the ratio of the deviations relative to the reference value and are selected so that when they are respectively applied at 98 to the respective waveforms their Stoneley waves are substantially compensated for uneven gains. Such equalization factors may also be obtained from a pre-calibration of the receivers. The equalization step 53 may be dispensed with when the receiver gains are adjusted to be equal during calibration.

A borehole size correction can be applied to the measured Stoneley energy following step 53 for the purpose of compensating for pressure changes due to variations in borehole diameter, for example, cave-ins. As a first order correction the pressure is inversely proportional to the borehole cross-section. The borehole cross-section can be measured directly by a dipmeter tool or inferred from a caliper measurement. The energy recorded in display 46 can be corrected by a factor equal to the change in borehole size relative to a reference borehole size and applicable to the region for which the energy was measured. Hence, if measured energy values determined at step 54 are represented by the parameter E, the borehole diameter a and a nominal borehole diameter b, then the corrected measurement $E_n$ is as follows:

$$E_n = E\, a^2/b^2$$

The nominal borehole diameter b is obtained either from the bit size or from the nominal borehole diameter indicated by the caliper trace 82.

Figure 2:
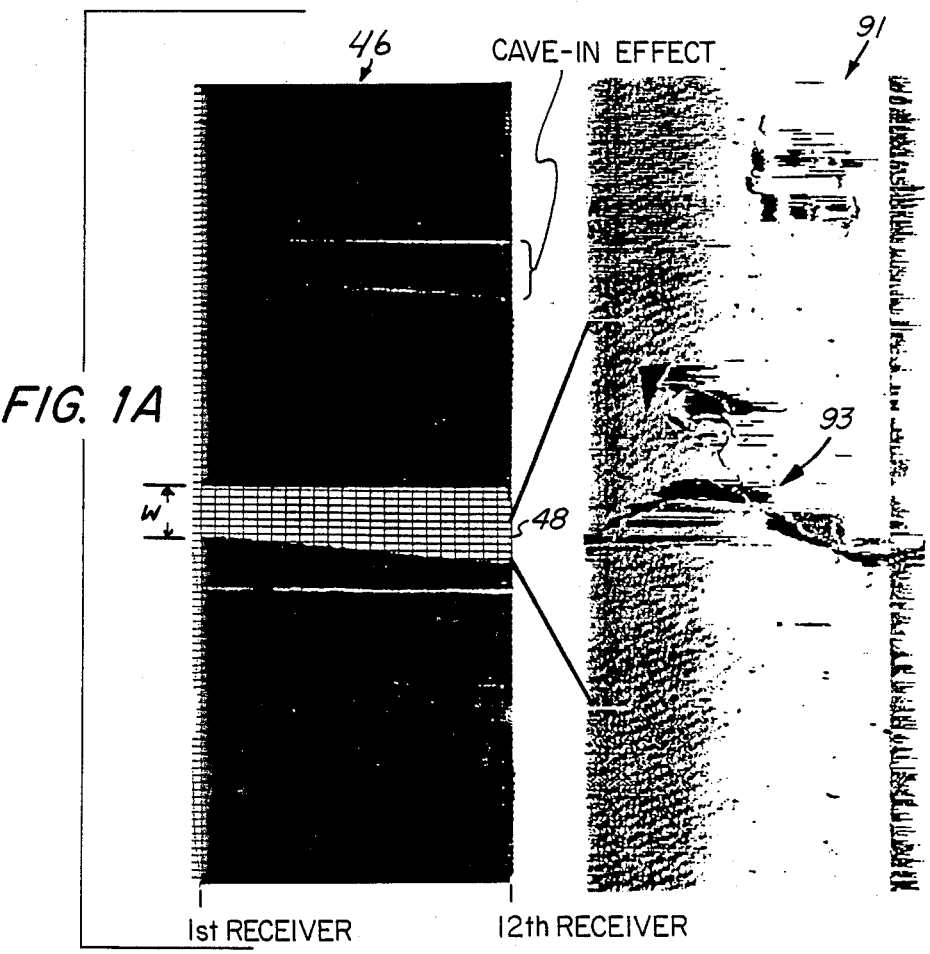
FIG. 2 is a block diagram of a technique for forming a display log in accordance with the invention.

The technique described with reference to FIG. 1 can be effective to reveal significant aspects of other characteristics such as the amplitude or energy of compressional and shear waves as detected by a plurality of vertically spaced transducers. Thus FIGS. 2 and 3 relate to generalized techniques in accordance with the invention where at 100 signals representative of an investigation of an earth formation with depth separated transducers are generated. In FIG. 2 the vertically separated transducers generate waveforms which contain redundant information with respect to an earth formation characteristic.

Figure 3:
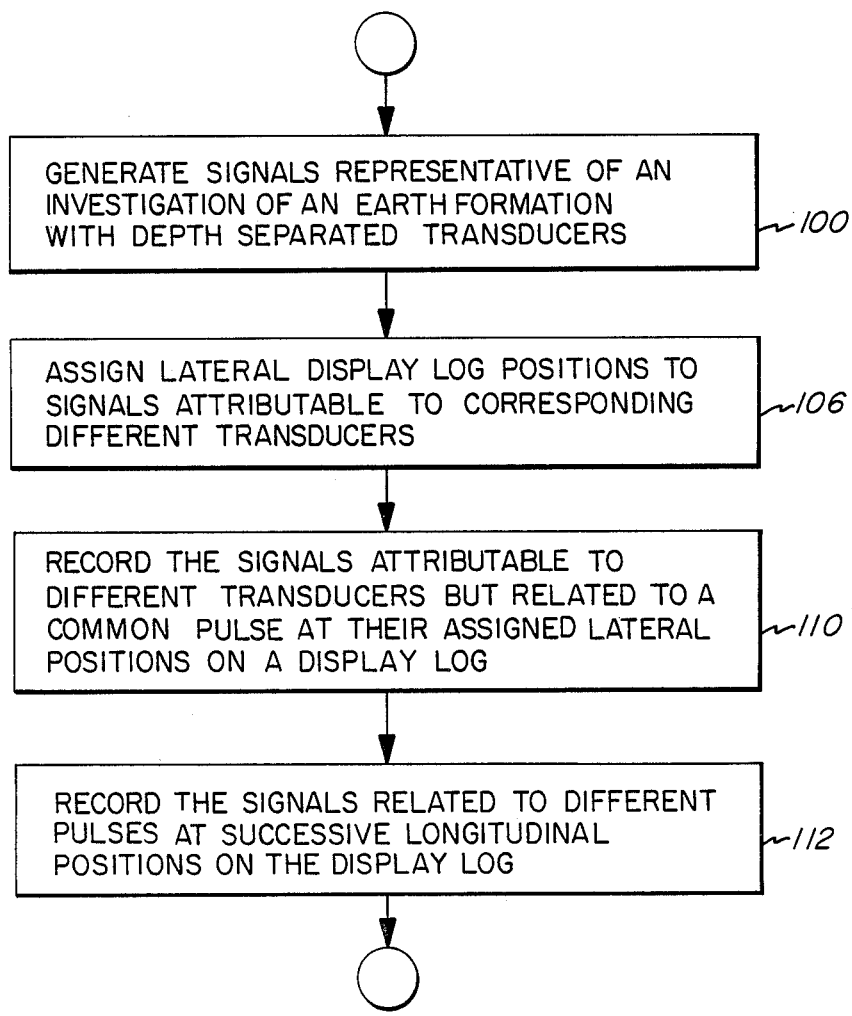
FIG. 3 is a block diagram of another technique for forming a display log in accordance with the invention.

At 102 in FIG. 2 signals are derived representative of the earth formation characteristic and then laterally recorded at 104 on a display log in correspondence with the transducers from which the waveforms were derived. In FIG. 3 the signals generated at 100 are assigned lateral display log positions at 106 and then recorded at 110 at their assigned lateral positions and the same repeated for successive sonic pulses at 112.

Figure 4:
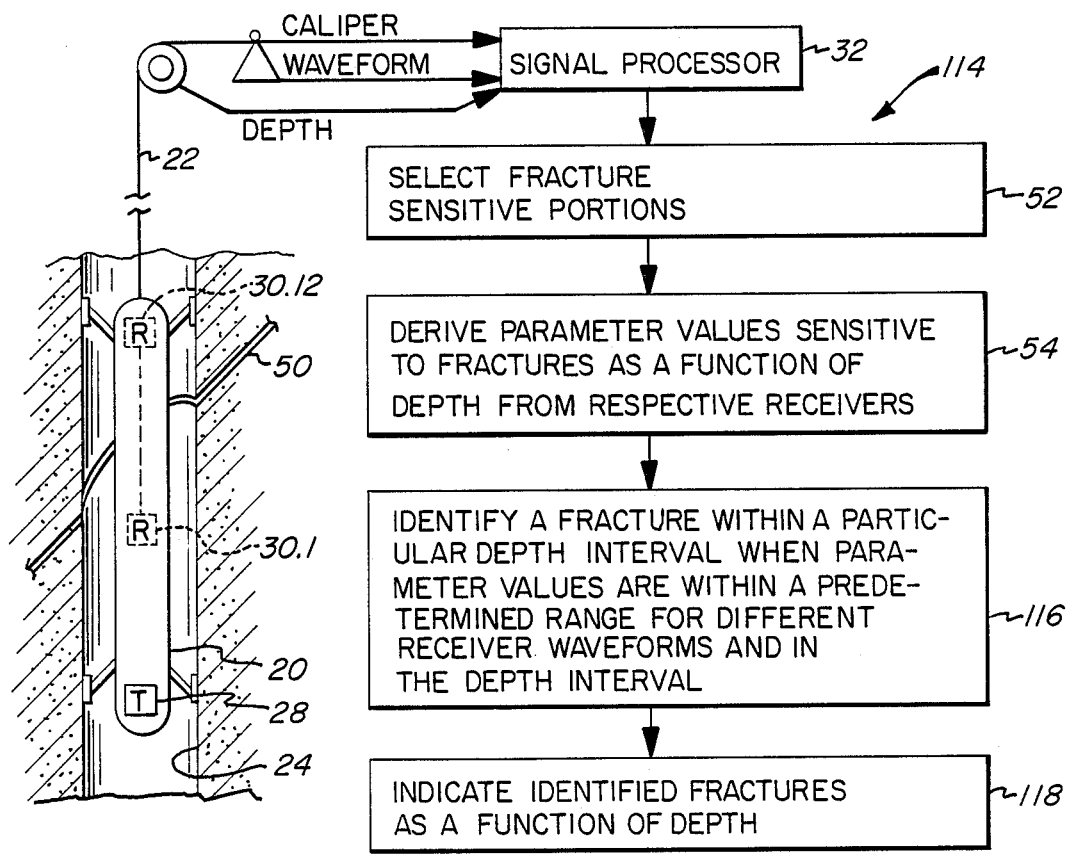
FIG. 4 is a block diagram for a technique in accordance with the invention for determining the presence of a facture from waveforms derived from an acoustic investigation of an earth formation from inside a borehole.

With a technique in accordance with the invention a indication of the presence of a fracture can be automatically obtained. Such technique is is shown in FIG. 4 with a signal processor 114. Here devices and operations that are similar to those described with reference to FIGS. 1-3 are given like numerals. Thus fracture-sensitive portions are selected at 52 and parameter values, such as the energy of the Stoneley waves, representative of fracture sensitivity are derived at 54.

At 116 the parameter values are evaluated to determine high contrast edges such as 90 and 92 in FIG. 1 bordering a region such as 48 and likely to indicate the presence of a fracture. The evaluation involves determining whether the parameter values fall within a particular range and whether this applies to different receiver waveforms at a common depth. In effect this detects a zone such as 48 in FIG. 1 for which all receiver waveforms encounter an energy loss for the Stoneley wave. If such zone is detected an indication of the possible presence of a fracture is made at 118. This indication may be visual or another recorded signal.

Figure 6:
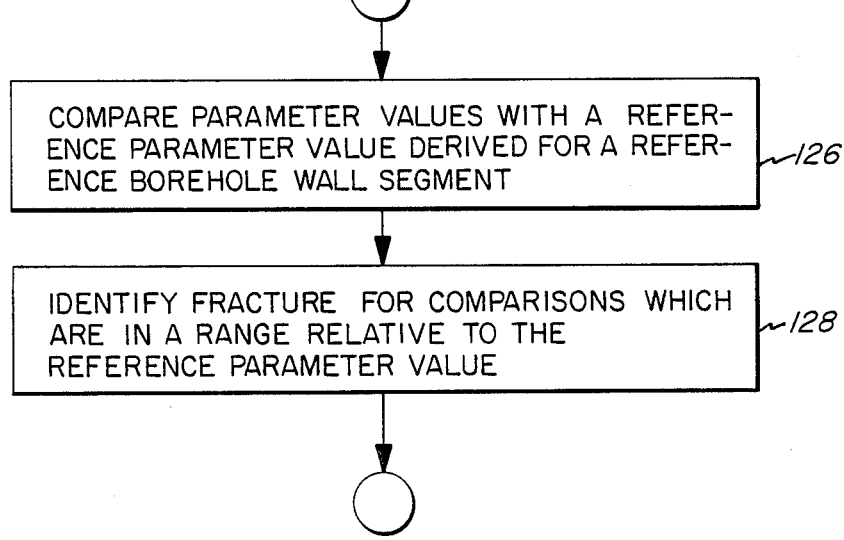
FIGS. 6 is a block diagram of an alternate technique for use in the embodiment of FIG. 4.
Figure 5:
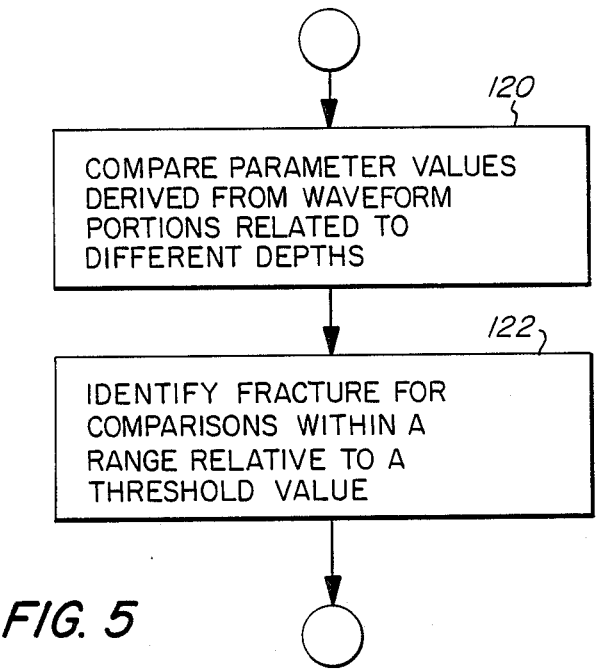
FIG. 5 is a block diagram of a technique for use in the embodiment of FIG. 4.

The criteria for which a fracture may be identified can be selected on the various bases as illustrated in FIGS. 5, 6, and 7. In FIG. 5 successive pairs of parameter values attributable to one receiver but for different depths are compared at 120. When the comparisons fall within a particular range, such as greater than a 10 db difference, a fracture can be identified at 122.

In FIG. 6 fracture sensitive parameter values are compared at 126 with a reference value. This is obtained from a reference borehole segment for which the values of the parameter are known to have a particular value. A fracture can be identified at 128 when a comparison is in a predetermined range relative to the reference parameter value.

In FIG. 7 a reference borehole segment and its depth are identified at 132 as free of fractures and substantially homogeneous. Such information can be obtained from previous investigations of the type of earth formation, or from core samples or from a preliminary inspection of the parameter log over the entire well. Thus, first log the well and compute the integrated energy, then pick an interval of high, relatively constant, energy. This interval, which preferably should be about 1,000 feet is likely to indicate a macroscopically unfractured formation.

The parameter values for the reference borehole segment are determined at 134 and a threshold value based on the latter parameter values is set at 136. Such threshold value may for example be set at several db below the reference value so that parameter values below this threshold value can be construed as indicative of the presence of a fracture.

One advantage of a large and long array of vertically spaced receivers 30.1-12 is that the stacked energy values as generated at 56 in FIG. 1 can be used to determine a likelihood of the presence as well as an evaluation of a fracture. Another technique relying upon the parameter values derived from various receiver waveforms is shown in FIG. 8.

At 142 fracture sensitive parameter values which are within a fracture indicating range and were derived from different receivers when these were in a common depth interval are identified. At 144 the number of different receivers satisfying the condition of step 142 are determined, and if the condition appears to apply to at least a predetermined number, as determined at 146, a fracture is deemed to be present for that depth interval.

Since a sufficient borehole diameter increase might appear as a fracture, the caliper signal may be used in the described techniques to exclude cave-ins from being identified as fractures. Accordingly, the technique 150 of FIG. 9 can be employed as part of the fracture identification. Thus at 152 the caliper signal is compared with a reference value, such as the nominal borehole diameter plus a tolerance factor K. If the comparison 152 shows that the borehole is larger than usual a cave-in appears likely to be the reason for the low fracture-sensitive parameter value and an indication to that effect is made at 154. If test 152 yields a negative answer a fracture indication can be made at 156. The indications of steps 154, 156 may be visual or in the form of a signal stored in a memory.

FIG. 10 illustrates a technique 160 to obtain an indication of the dip angle of a detected fracture. This involves at 162 a substraction of the transmitter-receiver spacing from the depth interval for which a fracture has been deemed to be present. This step can be applied to each of the fracture indicating intervals determined with the technique 140 of FIG. 8. The fracture depth intervals for the respective receivers can then be averaged. At 164 the dip angle θ is then computed and indicated at 166.

Having thus described various embodiments using the invention its advantages can be appreciated. Variations from the description herein can be made without departing from the scope of the invention.

What is claimed is:

1. A method for forming a display log of an acoustic investigation of an earth formation penetrated by a borehole with a tool which generates sonic pulses and produces different receiver waveforms respectively representative of sonic waves passed through a common interval alongside the tool, comprising the steps of:

measuring from said different waveforms values of a parameter that is representative of a characteristic of the earth formation;

assigning predetermined lateral display log positions for the parameter values measured from waveforms attributable to a common interval; and recording said parameter values on the display log along a longitudinal direction as a function of depth and along a lateral direction in accordance with assigned predetermined lateral display log positions to form a lateral spatial representation of vertically redundant measurements of the parameter.

2. The method as claimed in claim 1 and further including the steps of:

generating intermediate values for said parameter for lateral display log locations that are between said predetermined lateral positions;

recording said intermediate values at their respective lateral display log locations to form a laterally expanded display log of vertically-redundant parameter measurements.

3. The method as claimed in claim 2 wherein said first recording step includes:

laterally recording the parameter values derived from respective different receiver waveforms and attributable to a common sonic pulse as occurring at a common depth.

4. The method as claimed in claim 2 wherein said first recording step includes:

laterally recording the parameter values derived from respective different receiver waveforms and attributable to different sonic pulses as occurring at a common depth.

5. The method as claimed in claim 2 wherein said assigning step includes the step of placing predetermined display log positions sufficiently close so as to form a laterally substantially continuous display log of vertically-redundant parameter measurements.

6. The method as claimed in claim 5 wherein at least one of said recording steps comprises:

forming variable density values representative of the measured values of the parameter; and recording the variable density values on the display log so that laterally visual densities represent corresponding vertical investigations over the vertical distance spanned by the intervals.

7. The method as claimed in claim 6 wherein the latter recording step records variable densities representative of vertical investigations made over a vertical distance formed by an array of vertically spaced receivers.

8. The method as claimed in claim 7 wherein the latter recording step laterally records the variable density values from the respective receivers and attributable to a common transmitter pulse as if they were measured at the same depth.

9. The method as claimed in claim 1 and further including the steps of:

measuring a dimension of the borehole;

generating a correction factor representative of a change in the measured borehole dimension from a nominal value thereof; and applying the correction factor to the measured parameter value to derive a corrected measured parameter value.

10. The method as claimed in claim 1 wherein said assigning step includes the step of placing predetermined lateral display log positions sufficiently close so as to form a laterally substantially continuous display log of vertically-redundant parameter measurements.

11. A method for generating a real-time fracture indicating display log from a sonic investigation of an earth formation penetrated by a borehole and made with a tool located inside the borehole and having a sonic pulse generating transmitter and an array of vertically spaced sonic receivers, comprising the steps of:

generating waveforms from the receivers with the waveforms being representative of acoustic waves incident upon receivers after traveling along the borehole and inside the earth formation in response to sonic pulses from the transmitter as the tool travels along the borehole, with waveforms from different receivers containing redundant information with respect to an open fracture in the borehole wall;

deriving, from low frequency waveform portions representative of said redundant information and for each waveform portion derived from a different receiver, values of a parameter that is representative of sensitivity of the portion to a fracture in the borehole wall;

assigning predetermined lateral display log positions for the parameter values derived from waveform portions attributable to different receivers;

recording said parameter values on the display log along a longitudinal direction as a function of depth and along a lateral direction in accordance with assigned predetermined lateral display log positions to form a display log whose lateral dimension displays said redundant information.

12. The method as claimed in claim 11 and further including the steps of:

generating intermediate values for said parameter for lateral display log locations that are between said predetermined positions; and recording said intermediate values at their respective lateral display locations to form a laterally expanded display log.

13. The method as claimed in claim 12 wherein said step of generating intermediate values comprises the step of:

determining linearly interpolated values for the parameter corresponding to said lateral display log locations.

14. The method as claimed in claim 11 and further including the steps of:

forming optical values corresponding to said values of the parameter; and recording the optical values at respective ones of said lateral display log positions.

15. The method as claimed in claim 14 wherein said step of forming optical values comprises the step of:

generating grey scale values corresponding to said values of the parameter.

16. The method as claimed in claim 11 wherein said recording step includes the step of:
   laterally recording the parameter values derived from respective vertically spaced receiver waveforms and attributable to a common sonic pulse as occurring at a common depth.

17. The method as claimed in claim 11 and further comprising the steps of:
   stacking the values of the parameter derived from different receivers and attributable to a common sonic pulse; and
   recording the stacked parameter values for different sonic pulses in depth correspondence with the laterally recorded parameter values.

18. The method as claimed in claim 11 wherein said low frequency portions include the Stoneley wave and said parameter is representative of the energy of the Stoneley wave.

19. The method as claimed in claim 11 and further comprising the steps of:
   stacking the values of the parameter derived from respective receivers at a common tool depth; and
   recording stacked parameter values alongside and in depth correspondence with lateral displays of the parameter values derived from respective waveform portions.

20. The method as claimed in claim 11 and further including the step of:
   equalizing the waveform portions from respective receivers with respect to a reference borehole segment.

21. The method as claimed in claim 20 wherein the equalizing step comprises the steps of:
   measuring characteristic values of corresponding portions of waveforms from respective receivers for a reference borehole segment which is considered sufficiently homogeneous so as to be free of fractures;
   deriving a reference value from said characteristic values;
   deriving equalizing factors for the respective waveforms from said characteristic and reference values; and
   applying said equalizing factors to respective waveforms to compensate for gain variations attributable to the respective receivers from which the waveforms were obtained.

22. The method as claimed in claim 21 wherein the step of deriving a reference value comprises the step of:
   generating an average value of the characteristic values.

23. A method for investigating fracturing of an earth formation traversed by a borehole using acoustic energy, comprising the steps of:
   obtaining waveforms at a plurality of longitudinally spaced locations in said borehole, said waveforms corresponding to acoustic energy, including a tube wave, traveling between said locations and a common location;
   deriving from said energy-corresponding waveforms respective waveforms signals having predominately tube wave frequencies;
   determining indications of a tube wave energy for the respective borehole locations;
   identifying said energy indications for a common borehole depth;
   repeating said obtaining, deriving, determining and identifying steps over an interval of borehole depths;
   interpreting the energy indications for respective common depths as a function of the depths within said depth interval, to identify an anomaly indicative of a presence of fracturing;
   summing said energy indication for each respective depth over said depth interval;
   determining the depth width, w, of the identified anomaly and evaluating the expression;

$$\Theta = \tan^{-1}\left(\frac{w - TR}{a}\right)$$

where "a" is the diameter of the borehole at the corresponding depth and TR is the distance of the transmitter-receiver pair corresponding to the selected lateral position, to determine a dip angle $\theta$ of the fracture corresponding to the identified anomaly.

24. A method for generating a real-time fracture indicating display log from a sonic investigation of an earth formation penetrated by a borehole and made with a tool moved inside the borehole and having a sonic pulse generating transmitter and a plurality of vertically spaced sonic receivers comprising the steps of:
   generating waveforms from the receivers with the waveforms being representative of acoustic waves incident upon receivers after traveling along the borehole and inside the earth formation in response to sonic pulses from the transmitter as the tool travels along the borehole, with waveforms from different receivers containing redundant information with respect to successive depth intervals;
   deriving, from low frequency Stoneley segments of said waveforms and for each waveform derived from a different receiver, energy values representative of the energy in said segments;
   assigning predetermined lateral display log positions for the energy values derived from waveforms attributable to different vertically spaced sonic receivers and related to common borehole depth;
   generating energy values corresponding to locations that are between the predetermined lateral display positions;
   forming optical values that are representative of the respective energy values; and
   recording the optical values at respective lateral display log positions as a function of depth to form a laterally expanded display log on which parameter values indicative of fractures and attributable to different vertically spaced receivers in laterally visually enhanced.

25. The method as claimed in claim 24 wherein said step of forming optical values comprises the step of forming grey scale values representative of the parameter values to form said display log therewith.

26. The method as claimed in claim 24 and further comprising the steps of:
   measuring a crossectinal dimension of the borehole;
   determining the nominal value for the crossectional dimension of the borehole;
   generating a correction factor representative of the ratio between the measured and nominal crossectional dimensions of the borehole;

applying the correction factor to the measured parameter value to correct it.

27. A method for determining the presence of fractures in the wall of a borehole penetrating an earth formation from waveforms representative of an acoustic investigation of the borehole wall and its adjoining earth formation with a tool which generates sonic pulses and produces different receiver waveforms respectively representative of acoustic waves passed through a common depth interval, comprising the steps of:
  selecting fracture sensitive portions from the waveforms;
  deriving from said portions, values of a parameter that is representative of sensitivity of the portions to a fracture in the borehole wall;
  determining a threshold value from waveforms for a reference borehole wall segment;
  comparing the values of the parameter with the threshold value;
  identifying a fracture when results of comparisons made with waveform portions attributable to a common depth in the depth interval are within a predetermined range.

28. The method as claimed in claim 27 and further including the step of:
  visually recording the parameter value for the waveforms from respective receivers alongside each other as a function of depth.

29. The method as claimed in claim 27 wherein the comparing step includes the step of determining threshold value from waveform portions attributable to a borehole wall segment which is considered free of fractures.

30. The method as claimed in claim 29 wherein the step of determining a threshold value comprises the steps of:
  selecting a depth interval over which the parameter values are at a relatively constant level which is indicative of a macroscopically unfractured formation.

31. The method as claimed in claim 27 and further including the step of:
  determining the length of the depth interval for which parameter values continuously and consistently vary from the threshold values; and
  deriving from said length of said depth interval a dip signal representative of the dip angle of the fracture plane at the depth interval.

32. The method as claimed in claim 31 wherein said step of deriving the dip signal comprises the step of:
  removing, from said depth interval, the spacing distance between a sonic transmitter and a sonic receiver to derive a signal (h) representative of the vertical extent of the fracture at said depth interval, and
  determining the dip angle ($\theta$) according to the relationship $\theta = \tan^{-1} h/a$ where a is the diameter of the borehole at said depth interval.

33. The method as claimed in claim 27 wherein the comparing step includes the step of:
  comparing values of the parameter derived from a sonic receiver for one depth level to the values of the parameter obtained with the same receiver for a different depth level; and
  wherein the identifying step includes the step of:
  determining which comparisons exceed the threshold level as an indication of the presence of a fracture.

34. A method for evaluating an acoustic investigation of an earth formation penetrated by a borehole with a tool which generates acoustic pulses and produces different receiver waveforms respectively representative of acoustic waves passed through a common interval alongside the tool, comprising the steps of:
  measuring, from said different waveforms, values of a parameter that is sensitive to fractures in the earth formation;
  selecting parameter values attributable to a common depth within the common interval;
  assigning predetermined lateral display log positions for the parameter values measured from waveforms attributable to a common depth;
  recording said parameter values on a display log along a longitudinal direction as a function of depth and along a lateral direction in accordance with the assigned predetermined lateral display log positions;
  identifying from the recorded parameter values an anomaly extending laterally along the display log and along said longitudinal direction as indicative of the presence of fractures at the common depth;
  determining the inclination of said fracture from the length of the anamoly along said longitudinal direction; and
  repeating said steps for successive common depths within the common depth interval.

35. The method as claimed in claim 34 wherein the identifying step further comprises the steps of:
  comparing the values of the parameter with a threshold value; and
  identifying said anomaly when the comparisons attributable to a common depth are within a predetermined range.

36. A method for determining the presence of fractures in the wall of a borehole penetrating an earth formation from waveforms representative of an acoustic investigation of the borehole wall and its adjoining earth formation with a tool having a sonic pulse transmitter and an array of vertically spaced sonic receivers, comprising the steps of:
  selecting late arriving fracture sensitive portions from the waveforms;
  deriving, from individual ones of said portions, values of a parameter that is representative of the sensitivity of respective portions to a fracture in the borehole wall;
  comparing the values of the parameter as a function of depth with a threshold value;
  identifying a fracture within a particular depth interval when comparisons made with waveforms portions attributable to different receivers and for a common depth in the depth interval are within a predetermined range.

37. The method as claimed in claim 36 wherein the comparing step includes:
  determining a threshold value from waveforms for a reference borehole wall segment.

38. The method as claimed in claim 37 and further including the step of:

deriving from the length of said depth interval a dip signal representative of the dip angle of the fracture plane at that depth interval.

39. The method as claimed in claim 38 wherein said step of deriving the dip signal comprises the step of:
removing, from said depth interval, the spacing distance between a sonic transmitter and a sonic receiver to derive a signal (h) representative of the vertical extent of the fracture at said depth interval, and
determining the dip angle ($\theta$) according to the relationship $$\theta = \tan^{-1} h/a$$

where a is the diameter of the borehole at said depth interval.

40. The method as claimed in claim 36 wherein the step of determining the threshold value determines it for a borehole wall segment which is considered free of fractures.

41. The method as claimed in claim 36 wherein the comparing step includes the step of:
comparing values of the parameter derived from a sonic receiver for one depth level to the values of the parameter obtained with the same receiver for a different depth level; and
wherein the identifying step includes the step of:
determining which comparisons exceed the threshold level as an indication of the presence of a fracture.

42. The method as claimed in claim 36 and further including the step of:
recording an indication of the identified fracture for the associated depth interval.

43. The method as claimed in claim 36 and further including the step of:
visually recording the parameter value for the waveforms from respective receivers alongside each other as a function of depth.

44. A method for evaluating fractures in the wall of a borehole penetrating an earth formation from waveforms representative of an acoustic investigation of the borehole wall and its adjoining earth formation with a tool having one or a plurality of sonic pulse transmitters and a plurality of vertically spaced sonic receivers, comprising the steps of:
selecting late arriving fracture sensitive portions from the waveforms;
deriving, from individual ones of said portions, values of a parameter that is representative of the sensitivity of respective portions to a fracture in the borehole wall;
comparing the values of the parameter derived from waveform portions attributable to sonic pulses from a transmitter and detected by a receiver as a function of depth with a threshold value;
determining the depth interval for which the values of the parameter exceed the threshold value; and
removing, from a signal representative of said depth interval, the spacing distance between the latter transmitter and receiver, and provide a signal representative of the height of the fracture as measured along the borehole.

45. The method as claimed in claim 44 and further including the step of:
deriving from the signal representative of the height of the fracture and a signal representative of the diameter of the borehole, a dip signal representative of the dip angle of the plane of the fracture.

46. The method as claimed in claim 44 and further including the step of:
stacking the parameter values from the respective receivers for a common depth prior to the comparing step.

47. An apparatus for generating a real-time fracture indicating display log from a sonic investigation of an earth formation penetrated by a borehole and made with a tool having a sonic pulse generating transmitter and a plurality of vertically spaced sonic receivers which generate waveform signals in response to acoustic waves incident thereon, comprising:
means for deriving, from late arriving waveform portions, values of a parameter which is representative of sensitivity of the portions to a fracture in the borehole wall;
means for assigning predetermined lateral display log positions for the parameter values attributable to respective receiver waveforms; and
means for forming a display log on which the parameter values are recorded for the respective vertically spaced receivers along a longitudinal direction as a function of depth and along a lateral direction in accordance with the assigned display log positions.

48. The apparatus as claimed in claim 47 wherein said means for forming the display log includes
means for generating signals representative of optical values corresponding to said values of the parameter to form said display log therewith.

49. The apparatus as claimed in claim 47 wherein said optical value signals generating means generates signals representative of grey scale values corresponding to said parameter values to form said display log therewith.

50. The apparatus as claimed in claim 47 wherein said means for forming the display log includes:
means for stacking signals representative of the values of the parameter from respective receivers at a common tool depth and producing a stacked signal indicative thereof; with said stacked signal being placed in effective depth alignment with said laterally positioned parameter values.

51. The apparatus as claimed in claim 47 wherein said assigning means comprising:
means for producting intermediate values for said parameter for lateral display log locations that are between said predetermined positions; and
wherein said display log forming means includes said intermediate parameter values at their respective lateral display log locations to form a laterally expanded display log.

52. The apparatus as claimed in claim 47 wherein said means for generating intermediate values comprises:
means for determining the value of the parameter for said locations in direct proportion to the values of the parameter at positions between which the locations occur.

53. The apparatus as claimed in claim 47 wherein said display log forming means forms a display log on which the parameter values derived from respective vertically spaced receiver waveforms and attributable to a common sonic pulse are laterally recorded as occurring at a common depth.

* * * * *